US008502109B2

(12) United States Patent
Michon et al.

(10) Patent No.: US 8,502,109 B2
(45) Date of Patent: Aug. 6, 2013

(54) METHOD OF MONITORING THE WEAR OF AT LEAST ONE OF THE ELECTRODES OF A PLASMA TORCH

(75) Inventors: Ulysse Michon, Bordeaux (FR); Amelie Hacala, Bordeaux (FR)

(73) Assignee: Europlasma, Bruges (FR)

( * ) Notice: Subject to any disclaimer, the term of this patent is extended or adjusted under 35 U.S.C. 154(b) by 0 days.

(21) Appl. No.: 13/140,899

(22) PCT Filed: Dec. 17, 2009

(86) PCT No.: PCT/EP2009/067418

§ 371 (c)(1), (2), (4) Date: Aug. 15, 2011

(87) PCT Pub. No.: WO2010/070051

PCT Pub. Date: Jun. 24, 2010

(65) Prior Publication Data

US 2011/0284504 A1 Nov. 24, 2011

(30) Foreign Application Priority Data

Dec. 19, 2008 (EP) ...................................... 0858823

(51) Int. Cl.
*B23K 10/00* (2006.01)

(52) U.S. Cl.
USPC ................. 219/121.52; 219/123; 219/121.54; 219/121.5; 219/75; 313/231.51

(58) Field of Classification Search
CPC ........................................................ B23K 10/00
USPC ............ 219/121.39, 121.45, 121.48, 121.52, 219/121.54, 75; 315/111.21
See application file for complete search history.

(56) References Cited

U.S. PATENT DOCUMENTS 3,376,211 A 4/1968 Bjornson
4,683,367 A 7/1987 Drouet
(Continued)

FOREIGN PATENT DOCUMENTS

EP 0 204 052 12/1986
EP 0 750 451 12/1996
FR 2 609 358 7/1988

OTHER PUBLICATIONS

International Search Report dated Feb. 17, 2010, corresponding to the PCT application.

(Continued)

*Primary Examiner* — Mark Paschall
(74) *Attorney, Agent, or Firm* — Young & Thompson

(57) ABSTRACT

Method of controlling the wear of at least one of the electrodes of a plasma torch including two electrodes having the same main axis, and being separated by a chamber designed to receive a plasma-generating gas, and at least one element for generating a magnetic field placed locally to the at least one electrode for which the control of wear is sought, in which the arc root is made to sweep longitudinally over a portion of the surface of this electrode from an initial position until the arc root reaches a defined final position of the portion, the longitudinal progression of the arc root being defined by a function dependent on at least the time, f(t), which is fixed. At least the electrical energy consumed by the torch as a function of the time since the electrode was commissioned is measured, the measurements are recorded in a storage device and, from the temporal evolution of at least the electrical energy consumed over at least part of the measurements, an adjustment variable $\xi(t)$ is defined for the function f(t) over a period of time $\tau$ determined by the state of wear of the electrode.

17 Claims, 1 Drawing Sheet

(56) References Cited

U.S. PATENT DOCUMENTS

| | | | | |
|---|---|---|---|---|
| 4,780,591 | A * | 10/1988 | Bernecki et al. ......... | 219/121.52 |
| 4,847,466 | A | 7/1989 | Pasquini et al. | |
| 5,719,371 | A | 2/1998 | Spariat | |
| 7,608,797 | B2 * | 10/2009 | Belashchenko et al. . | 219/121.47 |
| 8,080,759 | B2 * | 12/2011 | Belaschenko ............ | 219/121.47 |
| 8,183,495 | B2 * | 5/2012 | Bijker et al. ............. | 219/121.48 |

OTHER PUBLICATIONS

Oliver, et al., "Control of Arc Plasma Torches: Compensation of Operational Enthalpy Drifts", Journal of Physics Publishing, Bristol, GB, vol. 113 No. 1, May 1, 2008.

* cited by examiner

METHOD OF MONITORING THE WEAR OF AT LEAST ONE OF THE ELECTRODES OF A PLASMA TORCH

The present invention relates to the field of plasma torches. More specifically, the invention concerns a method of controlling the wear of at least one of the electrodes of a non-transferred arc plasma torch.

It also concerns a non-transferred arc plasma torch for implementing this method.

A plasma torch is a system allowing electrical energy to be transformed into high-density thermal energy. An electric arc caused between two electrodes is typically utilized to provide the energy required to ionize a plasma-generating gas.

Plasma torches are used in industry, for example for depositing metal or for welding, or to destroy certain products such as hazardous waste.

Non-transferred arc plasma torches, also known as sprayed-arc torches, comprise two electrodes between which a sustained electric arc is generated. Since these electrodes are contained within the plasma torch, the electric arc is confined within the torch. On contact with this electric arc, the flow of gas injected into the torch is brought to a very high temperature and ionized.

The gas thus heated flows by the open extremity of one of the electrodes, known as the downstream electrode. Only the gas ejected at high temperature, or cone plasma, is consequently visible outside the torch.

Thus while the temperature of the cone plasma is 5,000° C., the temperature of the electric arc and, in particular, of the arc roots, is typically 20,000° C.

Since this temperature is higher than the melting temperature of the electrodes, vaporization of the electrodes at the arc roots, whatever the material used to manufacture these electrodes, is inevitable.

Although the electrodes are typically cooled, they constitute consumable items that must be replaced after a longer or shorter time of service.

The life-span of the cooled electrodes can vary from a hundred hours for relatively low power torches to a thousand hours for high-power torches.

For many years, research work has therefore been carried out to improve the life of the electrodes of the plasma torches so as to make them compatible with industrial requirements.

Firstly, it has been observed that the life of the electrodes was dependent on several parameters.

It is therefore possible to act on the shape of the electrodes and the choice of their constitutive material. Nevertheless, as the cone plasma is sprinkled with metal particles coming from the wear of the electrodes, the material or materials chosen must be compatible with the applications envisaged for the plasma torch.

In order to limit the average surface temperature of the electrodes, they can also be cooled, for example by implementing water circulation, generally demineralized.

It is also possible to limit the arc current for a given torch operating power. In effect, at the arc roots, the flow of calories to be evacuated increases with the current set at the electrodes' terminals.

Thus, for a given torch power, the possibility of realizing this power by a voltage-current pair favoring voltage over current is a major element since the wear of the electrodes is reduced.

However, all of these parameters belong to the design of a plasma torch. Thus, these parameters can no longer be modified after commissioning of this torch has taken place.

Distributing the erosion induced at the root of the electric arc over the largest possible electrode surface has even been proposed. Avoiding having the arc root remain attached to a single point of the electrode's surface, leading to its very rapid erosion, is sought through such a method of controlling the position of the root of the electric arc.

This control of the position of the arc root at the electrode's surface can be realized by injecting a variable flow of plasma-generating gas.

Advantageously, such a control is therefore realized solely by managing the plasma-generating gas inlet control valve. This management does not lead to modifications in the usages of the plasma torch.

Nevertheless, this method is not very flexible since it is thus essential to limit the ranges of flow variations in order to prevent the root of the electric arc possibly leaving the work area at the surface of the corresponding electrode. In addition, flow variations that are too great prevent good stability of the electric arc inside the plasma torch being obtained.

Control of the position of the arc root at the electrode's surface can also be realized by applying a fixed magnetic field, with mechanical mobility of the permanent magnet generating this magnetic field.

Such a control allows the wear at the electrode's surface to be distributed over a range of lengths related to the magnitude of the permanent magnet's displacement.

However, the displacement of this permanent magnet is completely independent of the plasma torch's operating point and, when it reaches the end of travel, the wear is greatly accelerated at the place where the arc root was fitted since the latter then describes a simple rotation. In addition, this magnet's displacement speed is generally constant over a defined time period.

Controlling the position of the arc root at the electrode's surface can also be realized by applying a variable magnetic field.

Document FR 2 609 358 discloses a non-transferred arc plasma torch comprising a field coil surrounding the torch's upstream electrode and an electrical circuit allowing this coil to be powered with a variable direct current such that a longitudinal displacement is described at the arc root in contact with this upstream electrode, on which is superimposed an oscillation of the arc root during this travel.

This method makes it possible to increase the number of degrees of freedom for control of the position of electric arc roots.

However, this oscillation of the arc root remains limited in excursion of the electrode's surface. This limitation of the surface seen by the arc root does not allow erosion of the electrode to be optimized.

Moreover, this solution is expensive and induces power consumption in addition to the power consumption of the plasma torch. The advantage of such technology disappears for plasma torches with power of less than 1 MW.

Furthermore, this technology of a field coil in the form of a disk is bulky (weight and dimensions), which makes it difficult to implement this type of torch in a constrained environment.

While these systems for controlling the displacement of the arc root have allowed the operational life of the electrodes to be extended, they can still be improved to distribute the wear of the electrode better.

The short life-span of the electrodes is indeed a significant disadvantage for some industrial applications.

The aim of the present invention is therefore to propose a method of controlling the wear of at least one of the electrodes of a plasma torch, simple in its design and method of operation, for optimizing the position of the root of the electric arc on the surface of this electrode and, consequently, the lifespan of these electrodes.

To this end, the invention relates to a method of controlling the wear of at least one of the electrodes of a plasma torch, this torch comprising two electrodes having the same main axis between which an arc is established, these electrodes being separated by a chamber designed to receive a plasma-generating gas, and at least one means for generating a magnetic field placed locally to the at least one electrode for which the control of wear is sought, in which the arc root is made to sweep longitudinally over a portion of the surface of this electrode starting from an initial position up to the point where said arc root reaches a defined final position on said portion involving the change of this electrode, the longitudinal progression of this arc root being defined by a function dependent on at least the time, f(t), which is fixed.

According to the invention, at least the electrical energy consumed by this torch is measured as a function of the time from the commissioning of said electrode, these measurements are recorded in a storage unit and, based on the temporal evolution of at least this electrical energy consumed over at least part of these measurements, a variable $\xi(t)$ is defined for adjusting the function f(t) over a period of time $\tau$ determined by this electrode's state of wear.

"Since the electrode was commissioned" means that these measurements are made in real time or at regular intervals from a new, or not, electrode. In the latter case, the initial and intermediate positions can nevertheless be determined in order to be able to resume control of electrode's wear at the position where it was interrupted in case of maintenance on the plasma torch for example.

"Electrodes having the same main axis" means that these electrodes are coaxial or that the upstream electrode, identified with respect to the direction of the plasma flow, has the same main axis as the downstream electrode.

"Locally" means that the means for generating a magnetic field creates a magnetic field at the electrode for which the control of wear is sought, so as to cause the displacement of the arc root on the surface of the electrode in question.

Purely for purposes of illustration, the plasma torch comprises a field coil surrounding the upstream electrode for generating a local magnetic field at this electrode; this coil is also fixed in position but powered with a variable direct current i(t) (=f(t)).

It is known that a set point of the current powering the field coil corresponds to a given position of the arc root on the upstream electrode. In addition, as this torch has a given configuration (geometry of the upstream electrode, electromagnetic characteristics of the field coil, etc.), it is possible to determine experimentally, by methods known to those skilled in the art, the curve representative of the position of the arc root on the upstream electrode according to the amperage applied to the field coil. Thus, having determined the equation of this curve and knowing the i(t) distribution (regular or not alternative sweep, pulsating ripple, etc.) governing the longitudinal progression of the arc root on the surface of the electrode, the person skilled in the art can control the electrode's wear by the longitudinal sweeping of arc root on the upstream electrode's surface between two positions.

However, the torch's operating conditions can vary over time, the torch not working at full capacity continuously, for instance. On the contrary, the plasma torch can experience periods of being on standby or power variations over time depending on the applications envisaged for this torch.

The wear of the electrode for a set point of the arc current is then slowed or, in contrast, accelerated.

The adjustment variable $\xi(t)$ then makes it possible to take into account not only the electrode's "assumed state" as defined by the function f(t) but its actual state, which depends on the plasma torch's actual stresses.

If the electrode wear is, for example, low for a set point of i(t) at time $t_o$ since the torch is on standby, maintaining the arc root longer in the corresponding position on the electrode surface will therefore be sought so as to lengthen this electrode's life. For this, an adjustment, or corrective, variable $\xi(t)=i_{cor}(t)$ will be applied such that the variable direct current applied to the field coil to control the position of the arc root is $i_B(t)=i(t)-i_{cor}(t)$ for a duration $\tau$ determined not only by the time during which the plasma torch remains on standby but also by the time necessary to reach a state of wear requiring switching to another point on the surface of the electrode for which the control of wear is sought.

In the case where the same field coil is mechanically displaced more in translation, then the adjustment variable $\xi(t)$ is a function of the form F(i(t), z(t)).

Of course, the operations determining the adjustment variable $\xi(t)$ can be performed by a computer that controls the means of controlling the position of the arc root. In the case of a field coil, for example, this computer controls the current powering this coil.

In different particular embodiments of this method, each having its specific advantages and capable of numerous possible technical combinations:

- the arc current is also measured as a function of the time since the electrode was commissioned, This measurement of the arc current advantageously allows a more accurate determination of the adjustment variable $\xi(t)$ of the function f(t). In effect, there can be different arc currents for the same electrical power $P_{arc}$ consumed by the torch.

- the arc root is oscillated on itself, during the sweep, around a mean position defined by the function f(t),
- this adjustment variable $\xi(t)$ is determined from the determination of the time-based change in the electrical energy consumed, on the one hand over all measurements, and on the other hand over the measurements obtained since a defined time interval T corresponding to different operating conditions for said torch,
- said at least one means of generating a magnetic field is chosen from the group comprising a field coil, a permanent magnet and combinations of these elements, When this means for generating a magnetic field is a field coil, it will preferably be a disk type for the upstream electrode.

According to different variants, this coil may be comprised of:

- a metal coil coaxial to the electrode. The conducting wire can be solid or hollow, square, rectangular or round,
- a single electrical conducting wire,
- several electrical conductors not physically linked together permanently, i.e. the coil may also be segmented,
- a number of layers N>=2. Each layer is then comprised of a number of turns S>=8. S is not necessarily identical for the N layers.

The coil may surround the electrode locally but the center of the coil is not necessarily linked to the center of the electrode along the axis of the torch.

Alternatively, the coil can be connected either in series with the electrode, or in parallel, i.e. without any electrical contact with the electrode.

The coil may also be longer, shorter or have the same dimension as the electrode.

For reasons of compactness, the diameter of this field coil can be reduced (loss of radial field). This loss of radial field can then be partially compensated for by adding one or more permanent magnets over all or part of the length of the field coil.

If this permanent magnet or these permanent magnets are cylindrical in shape, they will be then be coaxial to one of the electrodes.

One or more permanent magnets having different fields from the previous ones can be positioned outside the field coil, either upstream or downstream, in order to locally modify the shape of the field.

the at least one means of generating a magnetic field is moved along this main axis so as to vary the position on this electrode of the root of the electric arc generated between the electrodes, the at least one means of generating a magnetic field is moved with a variable speed over time, the at least one means of generating a magnetic field is moved with a speed varying progressively or in stages.

the at least one means of generating a magnetic field is moved either side of a reference position, simultaneously or successively, the at least one means of generating a magnetic field is moved along said main axis and the variable direct current is applied.

These means for controlling the electrode's wear can therefore act together to combine their effects.

The invention will be described in more detail with reference to the drawings included in an appendix, in which.

Figure 1:
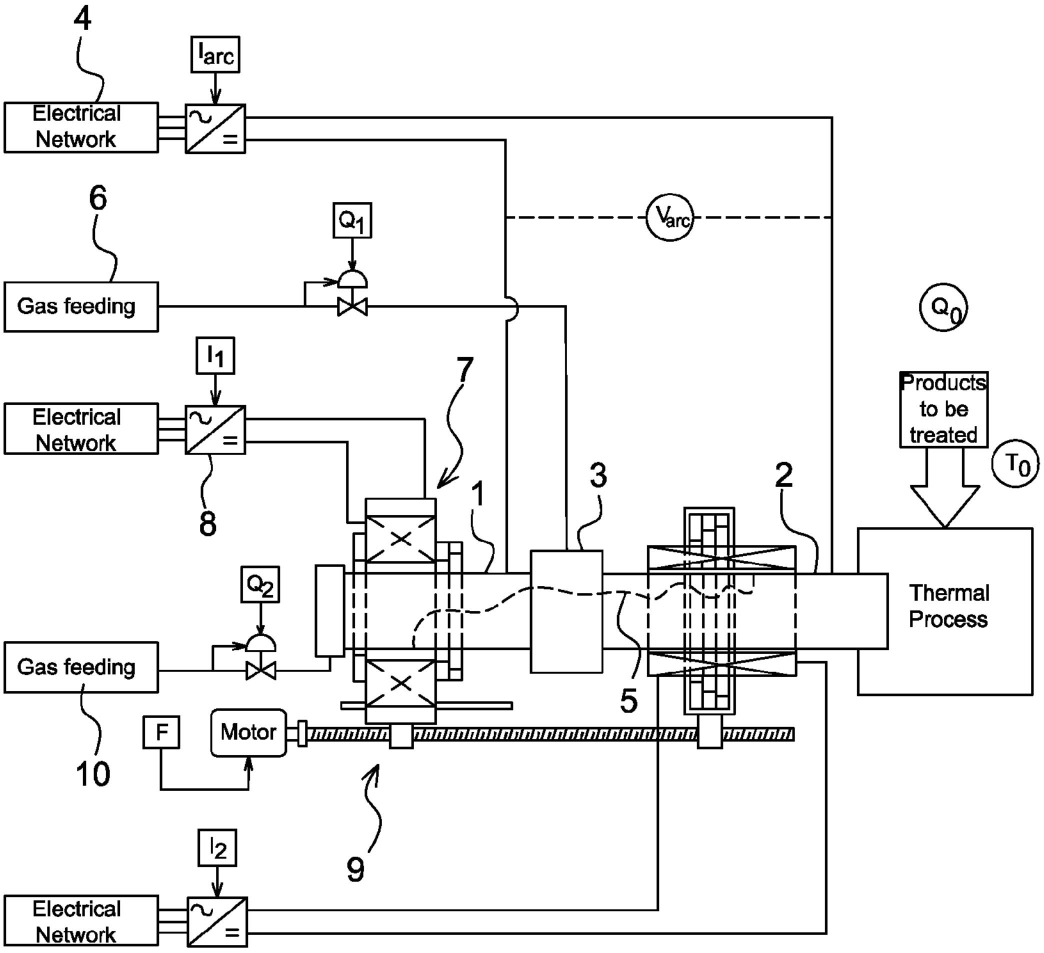
FIG. 1 is a cross-section view of a non-transferred arc plasma torch in a particular embodiment of the invention.

FIG. 1 shows a non-transferred arc plasma torch according to a particular embodiment of the invention. This torch has two tubular electrodes 1, 2 arranged colinearly along a main axis. These electrodes 1, 2 are cooled by a known water cooling device (not shown) of the state of the art, which will not be described in more detail here.

These electrodes 1, 2 are separated from each other by a chamber 3 designed to receive a plasma-generating gas.

An energy supply system 4 connected to these two electrodes 1, 2 allows a potential difference to be applied between them causing a sustained electric arc 5.

The arc current $I_{arc}$ and the arc voltage $U_{arc}$ are measured to determine the electrical power consumed $P_{arc}=I_{arc}\times U_{arc}$.

The plasma-generating gas, which is supplied by a gas supply source 6, is forced into this chamber 3. This plasma-generating gas is preferably introduced between the electrodes 1, 2 with a swirling movement, or in a vortex, so as to ensure a sheathing by the gaseous fluid and a stabilization of the electric arc.

Secondly, this swirling motion ensures a natural rotational movement of the upstream and downstream arc roots on the surface of the corresponding electrodes.

The means of generating a magnetic field advantageously comprises a field coil 7 that is powered with a variable direct current 8. "Variable direct current" means a direct current whose current varies with time.

This field coil 7 is here placed around the upstream electrode 1, so as to control the position of the upstream arc root on the surface of this electrode.

Preferably, the current of this variable direct current comprises a current $I_2$ superimposed on a current $I_1$, $I_2$ being an oscillation such that $I_2<I_1$, the variation of current $I_1$ being chosen from the group comprising linear variation, variation by stages, exponential variation, logarithmic variation, variation according to a polynomial function, or a combination of these elements.

Purely for purposes of illustration, the plasma torch is powered with a variable direct current whose base current $I_1$ varies by stages, each stage having a duration of several hundred hours, the electrode's wear thus occurring in "phases". Alternatively, this current $I_1$ can vary linearly or according to a "curve" distribution, e.g. exponential or polynomial.

Figure 2:
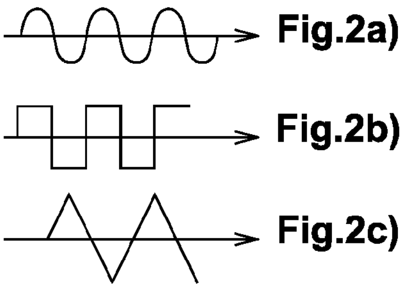
FIG. 2 shows schematically the current component $I_2$ superimposed on a base current $I_1$, $I_2$ being an oscillation such that $I_2<I_1$ and $I=I_1+I_2$ being the variable direct current applied to said coil of the upstream electrode in FIG. 1.

FIG. 2 shows the possible shape that the oscillation of current $I_2$, which makes it possible to oscillate the arc root around a mean position and consequently to limit wear of the upstream electrode, can take. This oscillation can have a sine curve (FIG. 2*a*), square (FIG. 2*b*) or triangular (FIG. 2*c*) shape.

The magnitude and frequency of this oscillation can vary over time depending on the electrical energy consumed by the plasma torch and the electrode's state of wear. Typically, the magnitude will be more limited when the torch is in an extreme operating range (low power, nominal power). The frequency of the wave will depend on the torch's operating enthalpy.

The waveform will be selected according to the stability of the torch's operating points observed. If the torch power varies discretely from one power to another in a programmed way, a square waveform will be preferred.

Given the mean current, that the field coil, when it reaches its maximum, can not sufficiently push the electric arc towards the downstream of the torch, copper remains unseen by the arc roots. It will therefore be advantageous to put the field coil in motion by displacing it. This displacement thus makes it possible to lower the value of the mean current through the field coil and apply new distributions for the increase in the mean current and also ripple waveforms.

To achieve this, the plasma torch comprises means 9 for displacing said at least one means of generating a magnetic field 7 along the main axis so as to vary the position on the electrode for which control of the wear of the root of the electric arc generated between these electrodes 1, 2 is sought.

These means 9 here comprise a worm screw driven in rotation by a motor. The field coil 7 is connected to this screw so that the rotation of the worm screw causes a translation of the field coil 7.

In the scenario in which moving said at least one means of generating a magnetic field either side of a reference position is wished, this motor may, for example, be a reciprocating motor.

Advantageously, the injection of a secondary plasma-generating gas 10 may also be modulated in a known way, so as to control the position of the arc root.

The invention claimed is:

1. A method of controlling wear of at least one of two electrodes (1, 2) of a plasma torch, said torch comprising the two electrodes (1, 2) having a same main axis between which an arc (5) is established, the arc (5) contacting each of the two electrodes (1, 2) at an arc root, the two electrodes (1, 2) being separated by a chamber (3) designed to receive a plasma-generating gas, and at least one means for generating a magnetic field (7) being placed locally to said at least one of the two electrodes (1, 2) for which wear is controlled, the method comprising:

sweeping the arc root longitudinally over a portion of a surface of said at least one of the two electrodes (1, 2) from an initial position up to a point where said arc root reaches a defined final position on said portion by varying at least a current to the at least one means for generating the magnetic field (7), as a function of time, wherein electrical power consumed by said torch since said at least one of the two electrodes (1, 2) was commissioned is measured in a series of measurements, wherein said series of measurements are recorded in a storage device, wherein based on a temporal evolution of said electrical power consumed over at least part of said series of measurements, an adjustment variable is determined to adjust the function of time and reduce wear on the at least one of the two electrodes (1, 2).

2. The method according to claim 1, wherein a current of the arc is also measured as a function of the time since said at least one of the two electrodes (1, 2) was commissioned.

3. The method according to claim 1, wherein said arc root is oscillated on itself, during the sweep, around a mean position defined by the function of time.

4. The method according to claim 1, wherein said series of measurements are made in real time or at regular intervals.

5. The method according to claim 1, wherein said adjustment variable is determined from the determination of a time-based change in said electrical power consumed, over all said series of measurements, or over the measurements obtained since a defined time interval T corresponding to different operating conditions for said torch.

6. The method according to claim 1, wherein said at least one means of generating a magnetic field (7) is chosen from the group comprising a field coil, a permanent magnet and combinations of these elements.

7. The method according to claim 6, wherein, said means of generating a magnetic field (7) comprising a field coil, said coil is powered with a variable direct current (8).

8. The method according to claim 7, wherein said variable direct current comprises a current $I_2$ superimposed on a current $I_1$, $I_2$ being an oscillation such that $I_2<I_1$, variation of the current $I_1$ is chosen from the group comprising linear variation, variation by stages, exponential variation, logarithmic variation, variation according to a polynomial function, or a combination of these elements.

9. The method according to claim 1, wherein said at least one means of generating a magnetic field (7) is moved along said main axis so as to vary the position on said electrode of the root of the electric arc generated between said two electrodes (1, 2).

10. The method according to claim 9, wherein said at least one means of generating a magnetic field (7) is moved with a variable speed over time.

11. The method according to claim 10, wherein said at least one means of generating a magnetic field (7) is moved with a speed varying progressively or in stages.

12. The method according to claim 10, wherein said at least one means of generating a magnetic field (7) is moved either side of a reference position.

13. The method according to claim 7, wherein, simultaneously or successively, said at least one means of generating a magnetic field (7) is moved along said main axis and the variable direct current is applied.

14. The method according to claim 1, wherein injection of a secondary plasma-generating gas (10) is modulated so as to control the position of the arc root.

15. The method according to claim 11, wherein said at least one means of generating a magnetic field (7) is moved either side of a reference position.

16. The method according to claim 2, wherein said arc root is oscillated on itself, during the sweep, around a mean position defined by the function of time.

17. A method for controlling electrode wear of a plasma torch, the plasma torch having a first electrode and a second electrode axially aligned with each other, the first electrode and the second electrode being constructed and arranged to establish an electrical arc having a first arc root on a surface of the first electrode and a second arc root on a surface of the second electrode, the plasma torch also having a gas chamber disposed between the first electrode and the second electrode, the gas chamber being constructed and arranged to receive a plasma-generating gas, the plasma torch also having a magnetic field generator disposed in proximity to the first electrode and constructed and arranged to move the first arc root on the surface of the first electrode, the method comprising:

varying a current to the magnetic field generator according to a periodic function of time such that the first arc root sweeps longitudinally between two points on the first electrode;

measuring power consumed by the plasma torch since the first electrode was installed on the plasma torch in a series of measurements;

recording each of the series of measurements in a storage device;

determining an adjustment variable indicating wear on the first electrode from the recorded series of measurements; and adjusting the periodic function of time based on the adjustment variable to reduce wear on the first electrode.

* * * * *